DEVICE FOR THE RECEPTION OF RADIOTELEPHONE DISTRESS SIGNALS

Filed Feb. 26, 1968 3 Sheets-Sheet 1

INVENTORS
SERGE GUENNOU
CLAUDE LEFEVRE
RAYMOND MAUGIS
BY [signature]
AGENT

Dec. 15, 1970 S. GUENNOU ET AL 3,548,316

DEVICE FOR THE RECEPTION OF RADIOTELEPHONE DISTRESS SIGNALS

Filed Feb. 26, 1968 3 Sheets-Sheet 2

INVENTORS
SERGE GUENNOU
CLAUDE LEFEVRE
RAYMOND MAUGIS

BY Frank R. Trifari

AGENT

DEVICE FOR THE RECEPTION OF RADIOTELEPHONE DISTRESS SIGNALS

INVENTORS
SERGE GUENNOU
CLAUDE LEFEVRE
RAYMOND MAUGIS
BY
Frank R. Trifari
AGENT 3,548,316

DEVICE FOR THE RECEPTION OF RADIO-TELEPHONE DISTRESS SIGNALS

Serge Guennou, Vitry, Claude Lefevre, St.-Maur, and Raymond Maugis, Paris, France, assignors, by mesne assignments, to U.S. Philips Corporation, New York, N.Y., a corporation of Delaware Filed Feb. 26, 1968, Ser. No. 708,133
Claims priority, application France, Feb. 24, 1967, 96,402
Int. Cl. H04q 9/12
U.S. Cl. 325—466 5 Claims

ABSTRACT OF THE DISCLOSURE

In a receiver for receiving signals having a modulation in the form of alternately occurring oscillations of different frequency (e.g. distress signals), an output amplifier is controlled by two channels corresponding to the two modulation frequencies, so that the amplifier is blocked in the absence of modulation. In order to avoid operation of the system as a result of parasitic signals, each channel includes an envelope demodulator, and means for controlling the gain of the channel as a function of the average value of the envelope.

This invention relates to a device for the reception of radiotelephone distress signals formed by a carrier alternately modulated by two oscillations of given, different frequencies, which device comprises, between the detection members and the power amplifier connected to a loudspeaker, two parallel channels, each of which corresponds to the transmission of one of the said modulation oscillations and comprises in series a selective filter tuned to one of said frequencies, an amplifier, a rectifier and a circuit having a time constant at least equal to the duration of the modulaton of the carrier by the oscillation associated with the other channel plus the time interval between two consecutive modulations, the output of which circuit is connected to one of the inputs of an AND-gate connected to said power amplifier.

It is known that the characteristics of the radiotelephone distress-signal transmitting and receiving apparatus mainly intended for use on coastal fishing boats and yachts are standardized.

There is already known a transmitting device in which a carrier of a frequency of 2182 kc./s. is alternately modulated by two oscillations of 1300 c./s. and 2200 c./s, respectively and the duration of the modulation of each frequency is 250±50 msec., while the interval between them must not exceed 50 msec. The distress signal, which has to be transmitted for 30 seconds and repeated every 150 seconds, may originate from an automatic radio beacon, which becomes operative at the contact with water, or from an "auto-alarm" device incorporated in the radiotelephone transmitter of the ship, actuated by a switch.

The monitoring receiver for the distress signal frequency of 2182 kc./s. has to allow on board permanent hearing of distress calls from a loadspeaker, of which the transmission is preceded by the radiotelephone distress signal. The receiver has to comprise inter alia a three-position switch for the following operations:

(1) reception of voice;
(2) filter monitoring;
(3) silent monitoring.

In the first position the receiver operates normally and allows hearing of the whole audio-frequency spectrum.

In the second position two filters having two pass bands including the frequencies of 1300 c./s. and 2200 c./s. respectively of the modulation oscillations are connected between the detection circuits and the A.F. amplifying circuit.

In the third position the loadspeaker is silent as long as there is not applied to the input of the receiver a carrier wave modulated by the radiotelephone distress signal.

For the latter function the receiver comprises the two filters adjusted to 1300 c./s. and 220 c./s. respectively, two amplifiers, two rectifying circuits of high time constant and an AND-gate. In this way, when the receiver is tuned to the distress carrier frequency of 2182 kc./s., the signals supplied by the two filters are amplified, then rectified and passed through a circuit of a time constant exceeding 300 msec. In the presence of a distress signal at the detection circuit of the receiver each channel transmits a permanent voltage to the inputs of the AND-gate, the output voltage of which unblocks the power amplifier so that the distress signal derived from a common output of the two filters can be heard.

The receiver may, however, be rendered operative prematurely by the reception of a parasitic signal of a high level, because the imperfect selectivity of the filters does not prevent the two channels from receiving sufficient signal voltage to produce the two rectified voltages required for the release of the power amplifier.

The device according to the invention avoids this disadvantage by employing means preventing the unblocking of the power amplifier in the absence of a distress signal in spite of the presence of parasitic signals in the two channels, while the latter signals are substantially completely eliminated when the distress signal is superimposed on said parasitic signals at the input of the device.

According to the invention the device for receiving radiotelephone distress signals is characterized in that, each channel comprises between its amplifier and its rectifier a demodulation device having a suitable time constant for causing the envelope of the distress-signal-modulated wave to appear at the output of said demodulation device. The output of the demodulator is connected through a filter and to an input of said amplifier so that the average voltage value of said envelope is capable of controlling the working point of the amplifier so that only the distress signal, eventually superimposed on a parasitic signal, is amplified. The output signal is also coupled through a capacitative connection to the rectifier associated with the circuit having a time constant in order to apply to each of the inputs of the AND-gate an unblocking voltage for the power amplifier.

When a distress signal is received by the device, each of the modulation oscillations circulating alternately through each of the channels produces a periodical signal at the output of the demodulator concerned, while the alternating component of said voltage applied to the rectifier of the channel concerned causes an unblocking voltage to appear at the output of each of these rectifiers during each corresponding time period and the AND-gate remains open since the circuit with the time constant forming the end element of each channel maintains under these conditions an unblocking signal of adequate value at the corresponding input of the AND-gate during the transmission of the other modulation, taking the rapid alternation of the transmission of said modulations into account.

However, if a parasitic signal appears in the two channels, the demodulation thereof does not produce in each of these channels the appearance of an alternating component and therefore, the rectifiers do not provide unblocking voltage for the AND-gate. If, however, the parasitic signals of each channel are themselves modulated at a frequency near that of the distress siganl, the AND-gate might be opened. The probability of such an event is extremely slight. The device according to the invention thus cuts off the loudspeaker during the reception of parasitic signals.

The invention will now be described with reference to the accompanying drawings, in which.

Figure 1:
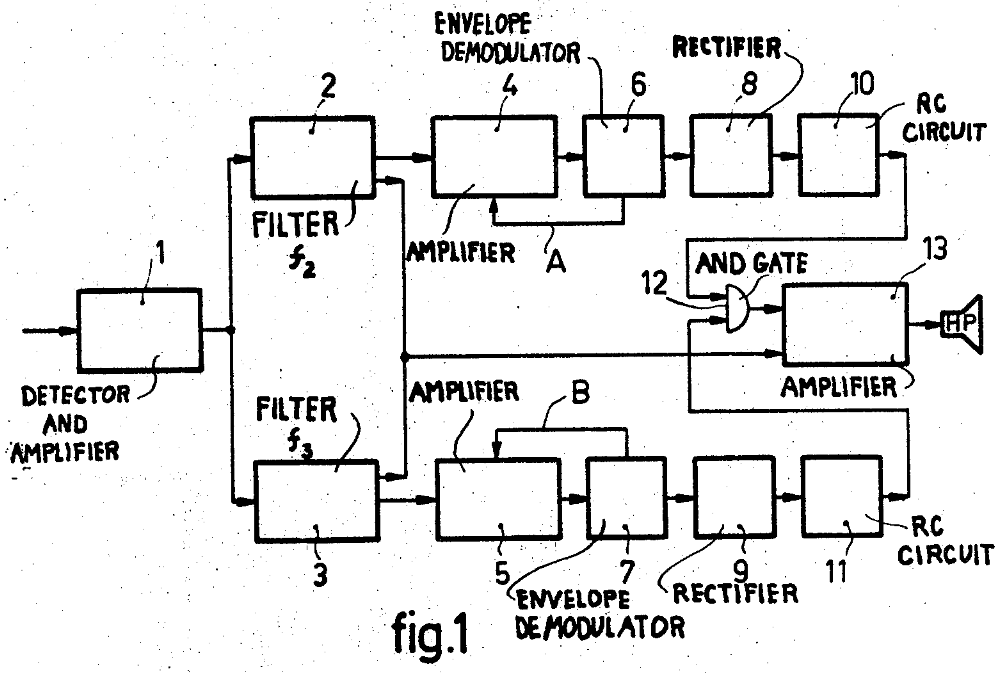
FIG. 1 shows the block diagram of a device according to the invention.
Figure 4A:
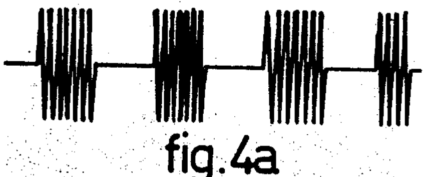
Figure 4B:
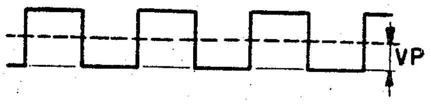
Figure 4C:
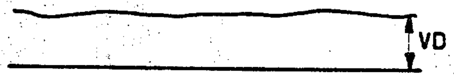

FIGS. 4*a*, 4*b*, 4*c* show the waveform of the signals as a function of time at different points of one of the channels of the device shown in FIG. 1.

Figure 5A:
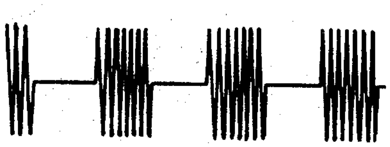
Figure 5B:
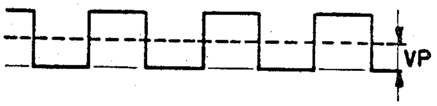
Figure 5C:
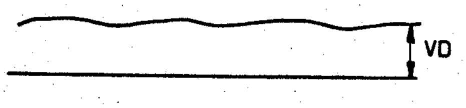

FIGS. 5*a*, 5*b*, 5*c* show the waveforms of the signals as a function of time at the corresponding points of the other channel.

Figure 6A:
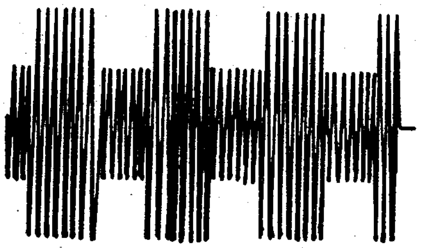
Figure 6B:
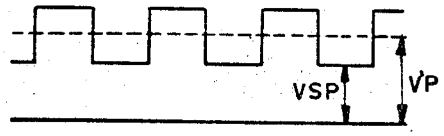
Figure 6C:
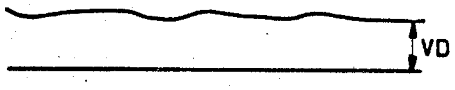

FIGS. 6*a*, 6*b*, 6*c* show the waveforms of the signals as a function of time at the same points of the channel of FIG. 4, when the distress signal is superimposed on an interference signal.

In the device shown in FIG. 1 the output of an audio-frequency detection and amplifying circuit 1 is connected to the inputs of filters 2 and 3.

These filters have pass bands centered at a frequency $F_2$ of 1300 c./s. and a frequency $F_3$ of 2200 c./s. A common output of these two filters is connected to the input of a power amplifier 13, whereas the two other outputs are connected to amplifiers 4 and 5 respectively. The outputs of the latter are connected to the inputs of demodulators 6 and 7 respectively, the main outputs of which are connected to RC-circuits 10 and 11 via rectifiers 8 and 9 respectively. Two auxiliary outputs of the demodulators 6 and 7 are respectively connected via conductors A and B to two auxiliary inputs of the amplifiers 4 and 5 of the same channel. The outputs of the RC-circuits 10 and 11 are connected to the inputs of an AND-gate 12, the output of which is connected to the unblocking input of the power amplifier 13, connected to a loundspeaker HP.

Figure 2:
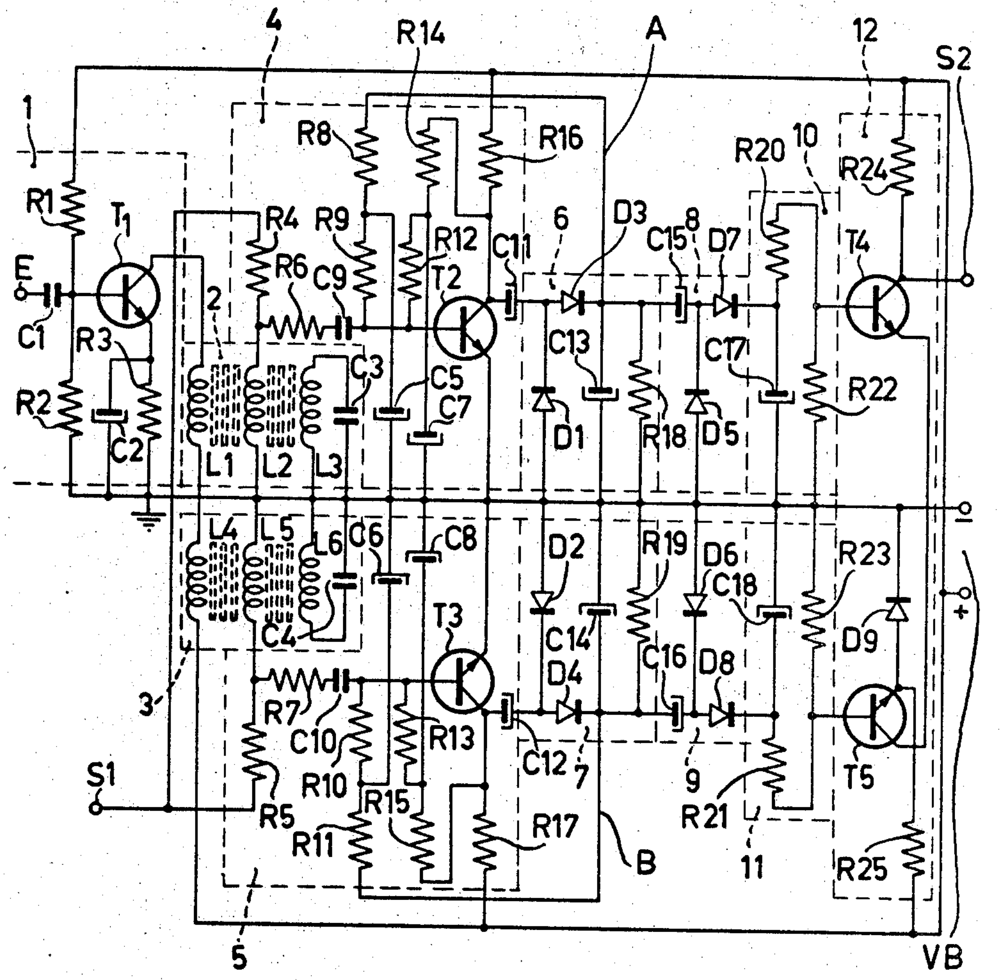
FIG. 2 shows the detailed diagram of an embodiment of the device of FIG. 1 without the power amplifier.

FIG. 2 shows a detailed diagram of the various elements indicated in the block diagram of FIG. 1. FIG. 1 only indicates the preamplifying stage preceding filters 2 and 3. This preamplifier is formed by a transistor $T_1$ of the npn-type, the base of which is supplied with signal from a terminal E via a capacitor $C_1$ and is polarized by means of a resistance bridge $R_1$ and $R_2$. The emitter of $T_1$ is connected to ground via a resistor $R_3$, shunted by a capacitor $C_2$.

The collector of $T_1$ is connected to the positive terminal of a voltage source VB, the negative terminal of which is grounded, through the windings $L_1$ and $L_4$ connected in series in the filters 2 and 3.

The two filters 2 and 3 are formed by windings $L_1$, $L_2$, $L_3$ and $L_4$, $L_5$, $L_6$ respectively, which are coupled by a magnetic core. Each filter is tuned to the frequency $F_2$ or $F_3$ by capacitors $C_3$ and $C_4$ in parallel with the windings $L_3$ and $L_6$ respectively. The outputs of the windings $L_2$ and $L_5$ remote from ground are connected on the one hand to a terminal $S_1$ via resistors $R_4$ and $R_5$ and on the other hand to the bases of the transistors $T_2$ and $T_3$ through capcitors $C_9$ and $C_{10}$ and resistors $R_6$ and $R_7$.

The amplifiers 4 and 5 comprise said npn-type transistors $T_2$ and $T_3$, the bases of which are connected on the one hand to the cathodes of diodes $D_3$ and $D_4$ of the demodulators 6 and 7 by the connections A and B, including series resistors $R_9$, $R_8$ and $R_{10}$, $R_{11}$ and on the other hand to their own collectors via series resistors $R_{12}$, $R_{14}$ and $R_{13}$, $R_{15}$. The junctions of these groups of resistors are shunted with respect to ground by capacitors $C_5$, $C_7$ and $C_6$, $C_8$ respectively. The collectors of $T_2$ and $T_3$ are connected to the positive terminal +VB through the resistors $R_{16}$ and $R_{17}$ respectively, whereas their emitters are directly connected to ground.

The anodes of the diodes $D_3$ and $D_4$ of the demodulators 6 and 7 are connected to the collectors of $T_2$ and $T_3$ via capacitors $C_{11}$ and $C_{12}$. These demodulators $C_{11}$ and $C_{12}$.

These demodulators comprise diodes $D_1$ and $D_2$, the anodes of which are connected to ground and the cathodes of which are connected to the anodes of the diodes $D_3$ and $D_4$ and to the resistors $R_{18}$ and $R_{19}$, shunted by the capacitors $C_{13}$ and $C_{14}$, arranged between the cathodes of $D_3$ and $D_4$ and ground. The demodulators are connected to the rectifiers 8 and 9 through capacitors $C_{15}$ and $C_{16}$ and said rectifiers are formed by diodes $D_5$, $D_6$, $D_7$ and $D_8$, while the anodes of the first two are connected to ground and the cathodes to the anodes of the two other diodes. The cathodes of the diodes $D_7$ and $D_8$ are connected to the RC-circuits 10 and 11, including capacitors $C_{17}$ and $C_{18}$ and resistors $R_{20}$, $R_{22}$, and $R_{21}$, $R_{23}$.

The AND-gate circuit 12 is formed by npn-type transistors $T_4$ and $T_5$, the bases of which are connected to the RC-circuits 10 and 11, the emitter of $T_4$ being connected to the collector of $T_5$. The collector of $T_4$, associated with a terminal $S_2$, is connected to the positive terminal of the source VB through a resistor $R_{24}$, and the emitter of $T_5$ is connected on the one hand to ground via a diode $D_9$ and on the other hand to said positive terminal via a resistor $R_{25}$.

Figure 3:
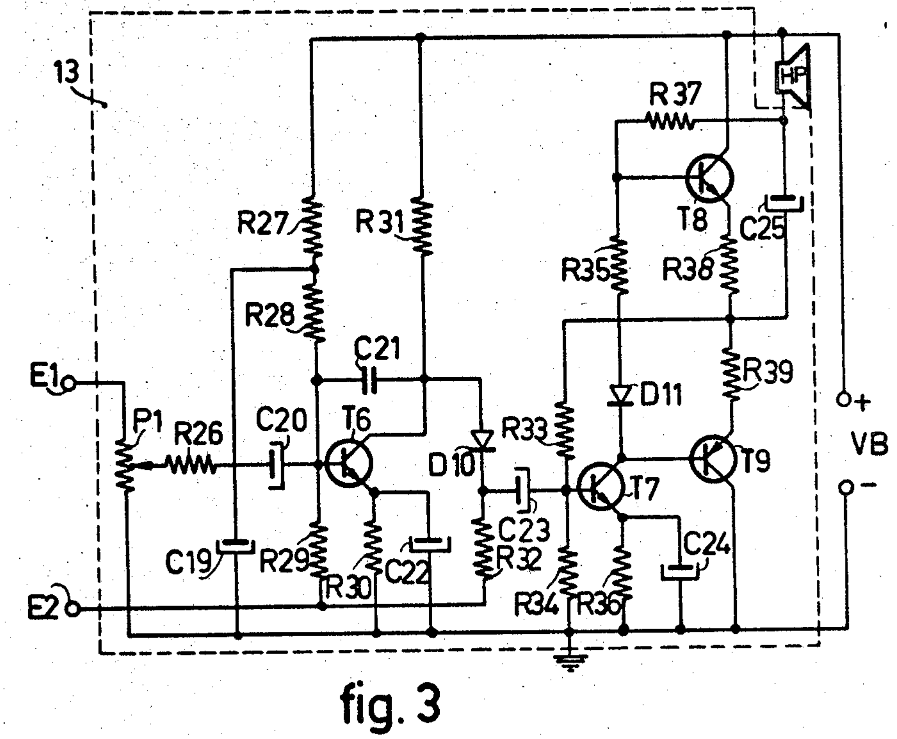
FIG. 3 shows the detailed diagram of an embodiment of the power amplifier of the device of FIG. 1.

As is shown in FIG. 3 the power amplifier 13 comprises a potentiometer $P_1$, one end of which is connected to a terminal $E_1$ and the other end is connected to ground. The tapping of $P_1$ is connected to the base of an npn-type transistor $T_6$ through a resistor $R_{26}$ and a capacitor $C_{20}$. The base of $T_6$ is polarised by a resistance bridge $R_{27}$, $R_{28}$, $R_{29}$ arranged between the positive terminal of the voltage source VB, the negative terminal of which is grounded, and a terminal $E_2$. The junction of the resistors $R_{27}$ and $R_{28}$ is shunted with respect to ground by a capacitor $C_{19}$. The emitter of $T_6$ is grounded via a resistor $R_{30}$, shunted by a capacitor $C_{22}$, whereas the collector is connected to said positive terminal via a resistor $R_{31}$. A capacitor $C_{21}$ is connected between the bases and the collector of $T_6$, while this collector is furthermore connected to the anode of a diode $D_{10}$, the cathode of which is connected to the terminal $E_2$ via a resistor $R_{32}$.

A transistor $T_7$ of the npn-type has its base connected to the junction of $D_{10}$ and $R_{32}$ through a capacitor $C_{23}$, which base is polarized by a resistance bridge $R_{33}$, $R_{34}$, connected on the one hand to the junction of the resistors $R_{38}$ and $R_9$ and on the other hand to ground.

The emitter of $T_7$ is connected to ground via a resistor $R_{36}$, shunted by a capacitor $C_{24}$, and the collector is connected on the one hand to the base of a pnp-type transistor $T_9$ and on the other hand to the cathode of a diode $D_{11}$, the anode of which is connected via a resistor $R_{35}$ to the base of an npn-type transistor $T_8$.

The collectors of $T_8$ and $T_9$ are connected respectively to the positive terminal of VB and to ground, and their emitters are interconnected by the resistors $R_{38}$ and $R_{39}$, to the junction of which is connected a capacitor $C_{25}$. The loudspeaker HP is connected between the capacitor $C_{25}$ and said positive terminal, and a resistor $R_{37}$ connects the base of $T_8$ to the junction of the loudspeaker and $C_{25}$.

The receiving device operates as follows (FIG. 2): The audio-frequency signal appearing at the terminal E is amplified by the transistor $T_1$ and simultaneously applied to the two filters 2 and 3. The output signals of the filters are mixed by the resistors $R_4$ and $R_5$ and applied to the terminal $S_1$, which is connected to the input $E_1$ of the power amplifier 13 (FIG. 3) and are amplified individually by the transistors $T_2$ and $T_3$.

FIGS. 4*a* and 5*a* illustrate the waveforms of the signals at the junctions of the resistors $R_4$, $R_6$ and $R_5$, $R_7$ respectively in the event of reception of a distress signal. The figures show the signals of 1300 c./s. and 2200 c./s. alternating in time.

FIG. 6*a* illustrates the waveform of the signal of the channel corresponding to FIG. 4*a* in the event the distress signal is superimposed on a parasitic signal.

The amplified signals appearing at the collectors of the transistors $T_2$ and $T_3$ are applied through the capacitors $C_{11}$ and $C_{12}$ to the demodulation circuits 6 and 7, the time constants of which, determined by the capacitors $C_{13}$, $C_{14}$ and the resistors $R_{18}$, $R_{19}$, are chosen so that the envelope of the distress-signal-modulated wave is obtained (FIGS. 4*b* and 5*b*). Thus square-wave signals of positive polarity are obtained, having a mean value VP with respect to ground, which signals are employed subsequent to filtering by the RC-circuits $R_8$, $R_9$, $C_5$ and $R_{10}$, $R_{11}$, $C_6$ for adjusting the polarization of each transistor $T_2$ and $T_3$.

In the absence of modulation oscillations at the bases of the transistors $T_2$ and $T_3$, the latter are polarized by the resistance bridges $R_{12}$, $R_{14}$, $R_{16}$ and $R_{13}$, $R_{15}$, $R_{17}$, shunted by the capacitors $C_7$ and $C_8$. In the presence of a modulating oscillation $T_2$ and $T_3$ are automatically polarized more positively as a function of the amplitude of the demodulated signal, so that said transistors are saturated at the positive peaks of the signals applied to their bases. In this manner the amplitude of the signals illustrated in FIGS. 4*b* and 5*b* are at a substantially constant level from the threshold that is rapidly attained.

When the distress signal is superimposed on a parasitic signal (FIG. 6*a*), the mean value VP′ increases. The polarization of $T_2$ and $T_3$ becomes more positive so that the voltage VSP, illustrated in FIG. 6, equal to the positive maximum amplitude of the parasitic signal subsequent to preamplification, corresponds to the saturation zone of the transistors. Thus only the distress signal is amplified, whereas the parasitic signal is eliminated.

The alternating component of the demodulated signals of FIGS. 4*b*, 5*b* and 6*b* is applied to the rectifiers 8 and 9, connected as voltage doublers and then to the RC-circuits 10 and 11.

The elements of the RC-circuits 10 and 11 of the rectifiers 8 and 9 are chosen so that the time constant exceeds the maximum duration of the modulation of one of the channels (300 msec. in this example). In the presence of a demodulated signal a positive, substantially constant voltage VD (FIGS. 4*c*, 5*c*, 6*c*) appears at the output of said circuits.

The AND-gate 12 is formed by npn-type transistors $T_4$ and $T_5$, connected in series. In the absence of a voltage at the bases of $T_4$ and $T_5$, the latter are cut off through the emitter of $T_5$, which is held at a positive voltage by the diode $D_9$, which is polarized by a slight steady current via the resistor $R_{25}$.

Under these conditions the voltage at the terminal $S_2$ is approximately equal to +VB and a positive voltage appearing at either of the bases of $T_4$ or $T_5$ is not capable of modifying this. However, two positive voltages simultaneously applied to the bases of $T_4$ and $T_5$ cause these transistors to become conducting, so that the voltage at the terminal $S_2$ drops to a value differing little from the voltage appearing across the diode $D_9$.

The power amplifier 13 of FIG. 3 is of the known symmetrical type, comprising complementary npn-pnp-type transistors $T_8$ and $T_9$ and a Class A connected transistor $T_7$.

The preamplifying transistor $T_6$ is supplied from the terminal $E_1$, which is connected to the terminal $S_1$ (FIG. 2); the potentiometer $P_1$ serves for volume control.

The terminal $E_2$, connected to the terminal $S_2$ (FIG. 2) serves to cut off the gain of the amplifier for silent monitoring in the absence of a distress signal. According as the inputs of the AND-gate 12 receive simultaneously or do not receive simultaneously a voltage, the terminal $E_2$ changes over from a voltage equal to that at the terminal of $D_9$ to a voltage +VB, for example, from +1 v. to +24 v. In the first case the transistor $T_6$ is normally polarized at its base and since its collector voltage exceeds the voltage at $E_2$, the diode $D_{10}$ is conducting and the signals are applied to the base of $T_7$. When the voltage at $E_2$ becomes highly positive, the transistor $T_6$ is driven into saturation and the diode $D_{10}$ is cut off, so that the diode cuts off any residual signals which may appear at the collector of $T_6$ in spite of the state of saturation thereof.

In the positions "voice reception" and "filter monitoring" a switch (not shown) causes the terminal $E_2$ to assume a fixed potential corresponding to the open state of the AND-gate.

What is claimed is:

1. A receiver for receiving a signal in the form of a carrier alternately modulated by first and second oscillations of first and second different frequencies respectively, comprising carrier signal demodulating means having an input for receiving said modulated carrier and an output for producing said first and second oscillations; first and second filters tuned to said first and second frequencies respectively and each having an input coupled to said output; normally blocked transmission circuit having a signal input coupled to receive said oscillations, an output, and an enabling input; first and second means for detecting said oscillations each having an input coupled to said first and second filter outputs respectively and an output; and means for unblocking said transmission circuit having two inputs coupled to said first and second detector outputs respectively and an output coupled to said enabling input.

2. A receiver as claimed in claim 1 further comprising first and second channel amplifiers coupled between said first and second filters and said first and second detectors respectively.

3. A receiver as claimed in claim 2 wherein said channel amplifiers each further comprise means for varying the gain thereof coupled to said first and second detector outputs respectively.

4. A receiver as claimed in claim 2 wherein said channel amplifiers each comprise a transistor connected in common emitter configuration and said first and second filter outputs being coupled to the bases of said transistors whereby said transistors are saturated in the presence of said oscillations.

5. A receiver as claimed in claim 1 further comprising first and second series combinations each comprising a rectifier and a time constant circuit, coupled between said first and second detector outputs and said unblocking means inputs respectively, said time constant circuits each having a time constant at least equal to the duration of said oscillations in said other channel plus the time period between alternate oscillations.

References Cited

UNITED STATES PATENTS

| | | | |
|---|---|---|---|
| 2,500,212 | 3/1950 | Starr | 325—466X |
| 2,523,315 | 9/1950 | Mayle | 325—392 |
| 3,022,493 | 2/1962 | Tschumi et al. | 325—466X |
| 3,040,298 | 6/1962 | Thomas, Jr. et al. | 340—171 |
| 3,332,021 | 7/1967 | Hedlund | 325—392 |

ROBERT L. GRIFFIN, Primary Examiner

A. H. HANDAL, Assistant Examiner

325—64, 55